US012674356B2

(12) United States Patent
Leach et al.

(10) Patent No.: US 12,674,356 B2
(45) Date of Patent: Jul. 7, 2026

(54) CLIMBING STICK

(71) Applicant: Latitude Outdoors, LLC, Grand Rapids, MI (US)

(72) Inventors: Kevin Leach, Grand Rapids, MI (US); Alex Chopp, Royal Oak, MI (US); Jake Matelic, Royal Oak, MI (US)

(73) Assignee: Latitude Outdoors, LLC, Grand Rapids, MI (US)

( * ) Notice: Subject to any disclaimer, the term of this patent is extended or adjusted under 35 U.S.C. 154(b) by 495 days.

(21) Appl. No.: 18/327,268

(22) Filed: Jun. 1, 2023

(65) Prior Publication Data

US 2024/0401409 A1 Dec. 5, 2024

(51) Int. Cl.

| | |
|---|---|
| ***E06C 1/38*** | (2006.01) |
| ***E06C 1/06*** | (2006.01) |
| ***E06C 7/08*** | (2006.01) |
| ***E06C 7/48*** | (2006.01) |

(52) U.S. Cl.

CPC ................ *E06C 1/381* (2013.01); *E06C 1/06* (2013.01); *E06C 7/08* (2013.01); *E06C 7/48* (2013.01)

(58) Field of Classification Search

CPC ... E06C 1/381; E06C 1/06; E06C 7/08; E06C 7/48; A63B 27/00; A01M 31/02

USPC .......................................... 182/189, 100, 93

See application file for complete search history.

(56) References Cited

U.S. PATENT DOCUMENTS

| | | | | |
|---|---|---|---|---|
| 3,487,518 A | 1/1970 | Hopfeld | | |
| 4,371,055 A | 2/1983 | Ashton et al. | | |
| 4,376,470 A | 3/1983 | Ashton | | |
| 5,109,954 A | 5/1992 | Skyba | | |
| 5,156,234 A | 10/1992 | McCallum et al. | | |
| 5,806,626 A | 9/1998 | Jenkins, Jr. | | |
| 5,816,362 A | 10/1998 | Jenkins, Jr. | | |
| 5,954,157 A | 9/1999 | Grimes et al. | | |
| 5,979,603 A | 11/1999 | Woller | | |
| 6,170,212 B1 * | 1/2001 | Suchyna | ................ | E04F 15/10 52/471 |
| 6,267,202 B1 | 7/2001 | Nelson | | |
| 6,547,035 B1 | 4/2003 | D'Acquisto | | |
| 6,568,505 B1 | 5/2003 | D'Acquisto | | |
| RE39,725 E | 7/2007 | Muhich | | |

(Continued)

FOREIGN PATENT DOCUMENTS

| | | | | | |
|---|---|---|---|---|---|
| DE | 202009009545 U1 * | 12/2009 | ............... | E06C 1/39 |
| JP | 2021104626 A | 7/2021 | | |
| WO | WO-0043612 A1 * | 7/2000 | ............... | E04B 5/12 |

*Primary Examiner* — Brian E Glessner

(74) *Attorney, Agent, or Firm* — Willard Quinn PLLC

(57) ABSTRACT

A climbing stick includes first and second steps, a post, and a standoff. First and second outer walls and an inner wall extend the length of the post. The inner wall is between the first and second outer walls. First diagonal walls extend upward and rightward from the first outer wall to the second outer wall. Second diagonal walls extend upward and leftward from the second outer wall to the first outer wall. A first floor portion extends the length of the post between the first outer wall and inner wall. A second floor portion extends the length of the post between the second outer wall and inner wall. The first and second floor portions are interrupted by the first and second diagonal walls. The standoff extends rearward from the first step to a rear wall of the standoff with ridges and valleys arranged in alternating fashion to form teeth.

17 Claims, 7 Drawing Sheets

(56) References Cited

U.S. PATENT DOCUMENTS 7,434,662 B2 10/2008 McFall et al.
7,926,775 B1 4/2011 Milazzo et al.
8,292,033 B2 10/2012 Hale
9,027,709 B2 5/2015 Wheelington
D762,139 S 7/2016 Wheelington
9,611,692 B1 4/2017 Rogers
D872,308 S 1/2020 Hand
10,524,467 B1 1/2020 Garis
10,791,729 B1 10/2020 Power, II et al.
10,926,489 B2 2/2021 Davidson et al.
10,973,224 B2 4/2021 Infalt et al.
11,198,038 B1 12/2021 Power, II et al.
11,317,622 B2 5/2022 Power, II et al.
2004/0216952 A1 11/2004 Woller
2006/0032705 A1 2/2006 Isham et al.
2007/0000726 A1 1/2007 Berkbuegler
2007/0205053 A1 9/2007 Isham et al.
2009/0000867 A1* 1/2009 Wang ...................... E06C 7/081 182/104
2010/0299108 A1 11/2010 Glaser et al.
2010/0300808 A1 12/2010 Hale
2011/0132686 A1 6/2011 Priest
2012/0125715 A1 5/2012 Furseth et al.
2014/0190767 A1 7/2014 Wheelington
2014/0209412 A1* 7/2014 Zorney ..................... E06C 1/06 182/180.1
2014/0311829 A1 10/2014 Priest et al.
2016/0069133 A1 3/2016 Priest et al.
2018/0073298 A1 3/2018 Hand
2018/0192634 A1 7/2018 Check
2019/0055782 A1 2/2019 Infalt et al.
2021/0204538 A1 7/2021 Power, II et al.
2021/0205667 A1 7/2021 Garis
2021/0227819 A1 7/2021 Infalt et al.
2021/0283467 A1 9/2021 Booth
2022/0025702 A1* 1/2022 Hebert .................... E06C 7/082
2022/0195802 A1* 6/2022 D'Acquisto .............. E06C 9/02
2022/0305344 A1 9/2022 Power, II et al.
2023/0241458 A1* 8/2023 D'Acquisto ........... A63B 27/00 182/189
2023/0330491 A1* 10/2023 Lee ........................ A63B 27/00
2023/0374857 A1* 11/2023 D'Acquisto .......... A01M 31/02
2024/0293700 A9 9/2024 Leach et al.

* cited by examiner

CLIMBING STICK

BACKGROUND OF THE DISCLOSURE

The present disclosure generally relates to a climbing stick. More specifically, the present disclosure relates to a climbing stick that includes a post and a standoff.

SUMMARY OF THE DISCLOSURE

According to one aspect of the disclosure, an injection-molded climbing stick includes a first step, a second step, a post extending from the first step to the second step along a length of the post, and a standoff. The post includes a first outer wall that extends in a lengthwise direction of the post, a second outer wall that extends in the lengthwise direction of the post, an inner wall that extends in the lengthwise direction of the post and is positioned between the first and second outer walls, a plurality of first diagonal walls each of which extends upward and rightward from the first outer wall to the second outer wall, a plurality of second diagonal walls each of which extends upward and leftward from the second outer wall to the first outer wall, a first floor portion that extends in the lengthwise direction of the post and extends between the first outer wall and the inner wall, and a second floor portion that extends in the lengthwise direction of the post and extends between the second outer wall and the inner wall. The first floor portion is interrupted by the pluralities of first and second diagonal walls. Further, the second floor portion is interrupted by the pluralities of first and second diagonal walls. The standoff extends rearward from the first step to a rear wall of the standoff and includes a plurality of ridges and a plurality of valleys arranged in alternating fashion to form a plurality of teeth. At least one of the plurality of valleys defines a plurality of grooves.

According to another aspect of the disclosure, a climbing stick includes a first step, a second step, and a post extending from the first step to the second step along a length of the post. The post includes a first outer wall that extends in a lengthwise direction of the post, a second outer wall that extends in the lengthwise direction of the post, an inner wall that extends in the lengthwise direction of the post and is positioned between the first and second outer walls, a plurality of first diagonal walls each of which extends upward and rightward from the first outer wall to the second outer wall, a plurality of second diagonal walls each of which extends upward and leftward from the second outer wall to the first outer wall, a first floor portion that extends in the lengthwise direction of the post and extends between the first outer wall and the inner wall, and a second floor portion that extends in the lengthwise direction of the post and extends between the second outer wall and the inner wall. The first floor portion is interrupted by the pluralities of first and second diagonal walls. Further, the second floor portion is interrupted by the pluralities of first and second diagonal walls.

According to another aspect of the disclosure, an injection-molded climbing stick includes a first step, a second step, a post extending from the first step to the second step along a length of the post, and a standoff extending rearward from the first step to a rear wall of the standoff that includes a plurality of ridges and a plurality of valleys arranged in alternating fashion to form a plurality of teeth. At least one of the plurality of valleys defines a plurality of grooves.

These and other features, advantages, and objects of the present disclosure will be further understood and appreciated by those skilled in the art by reference to the following specification, claims, and appended drawings.

Figure 1:
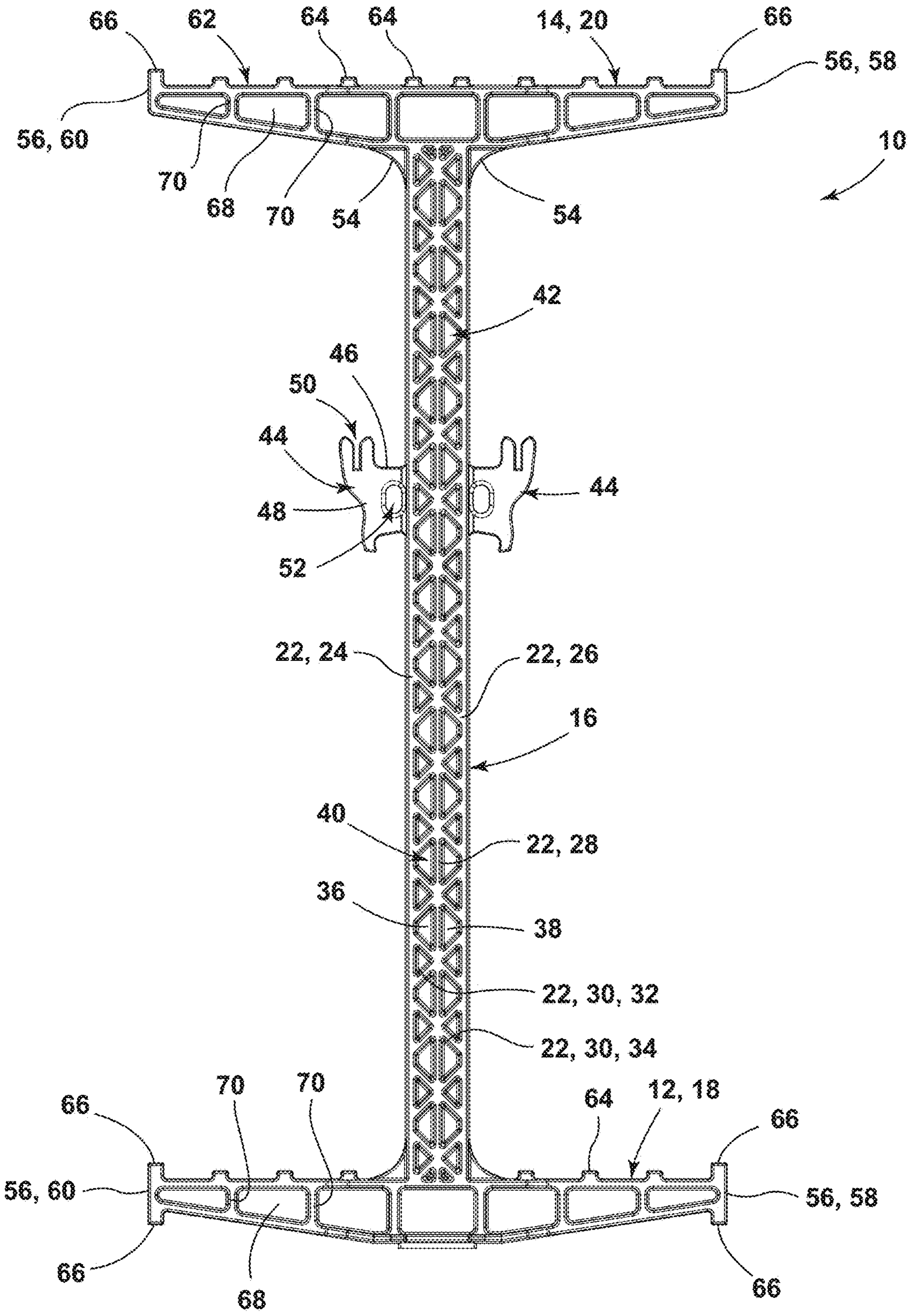
FIG. 1 is a front elevational view of a climbing stick.

The components in the figures are not necessarily to scale, emphasis instead being placed upon illustrating the principles described herein.

DETAILED DESCRIPTION

The present illustrated embodiments reside primarily in apparatus components related to a climbing stick. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "lateral," "rear," "front," "vertical," "horizontal," "upward," "downward" and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. Unless stated otherwise, the term "forward" shall refer to toward the intended viewer and/or closer to the intended viewer based on the context. For example, the phrase "extending forward" shall be interpreted as extending toward the intended viewer, while a first element being "forward of" a second element shall refer to the first element being closer than the second element to the intended viewer. Unless stated otherwise, the term "rearward" shall refer to away from the intended viewer and/or further from the intended viewer based on the context. For example, the phrase "extending rearward" shall be interpreted as extending away from the intended viewer, while a first element being "rearward of" a second element shall refer to the first element being further than the second element from the intended viewer. Unless stated otherwise, the term "lateral" and derivatives thereof shall refer to left-right directions. However, it is to be understood that the disclosure may assume various alternative orientations, except where expressly specified to the contrary. It is also to be understood that the specific devices illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-7, reference numeral 10 generally designates a climbing stick. The climbing stick 10 includes a first step 12, a second step 14, and a post 16 that extends between the first and second steps 12, 14. In the embodiment illustrated in FIG. 1, the first step 12 of the climbing stick 10 is a bottom step 18 and the second step 14 is a top step 20 that is positioned upward of the bottom step 18. In various implementations, the first step 12 may be the top step 20 and the second step 14 may be the bottom step 18 positioned downward of the top step 20. The post 16 of the climbing stick 10 extends from the first step 12 to the second step 14 along a length of the post 16.

The post 16 can include a plurality of walls 22 that protrude outward from at least one floor portion of the post 16. One or more of the plurality of walls 22 may extend in a lengthwise direction of the post 16 (i.e., along the length of the post 16). For example, as illustrated in FIG. 1, the post 16 includes a first outer wall 24 that extends in the lengthwise direction of the post 16, a second outer wall 26 that extends in the lengthwise direction of the post 16, and an inner wall 28 that extends in the lengthwise direction of the post 16. The inner wall 28 is positioned between the first and second outer walls 24, 26.

The plurality of walls 22 of the post 16 may include one or more diagonal walls 30. In the embodiment illustrated in FIG. 1, the post 16 includes a plurality of first diagonal walls 32 and a plurality of second diagonal walls 34. Each of the first diagonal walls 32 extends upward and rightward from the first outer wall 24 of the post 16 to the second outer wall 26. Each of the second diagonal walls 34 of the post 16 extends upward and leftward from the second outer wall 26 to the first outer wall 24. As illustrated in FIG. 1, the pluralities of first and second diagonal walls 32, 34 extend diagonally between the first and second outer walls 24, 26 relative to the lengthwise direction of extension of the first and second outer walls 24, 26.

Referring still to FIG. 1, a first floor portion 36 extends in the lengthwise direction of the post 16 and extends between the first outer wall 24 and the inner wall 28. As illustrated in FIG. 1, the first floor portion 36 is interrupted by the pluralities of first and second diagonal walls 32, 34. As such, the first outer wall 24, the inner wall 28, the plurality of first diagonal walls 32, the plurality of second diagonal walls 34, and the first floor portion 36 cooperate to define a plurality of first pockets 40 that are disposed along the post 16.

A second floor portion 38 extends in the lengthwise direction of the post 16 and extends between the second outer wall 26 and the inner wall 28. As illustrated in FIG. 1, the second floor portion 38 is interrupted by the pluralities of first and second diagonal walls 32, 34. As such, the second outer wall 26, the inner wall 28, the plurality of first diagonal walls 32, the plurality of second diagonal walls 34, and the second floor portion 38 cooperate to define a plurality of second pockets 42 disposed along the length of the post 16. As illustrated in FIG. 1, the inner wall 28 is disposed laterally between the plurality of first pockets 40 and the plurality of second pockets 42 defined by the post 16 of the climbing stick 10. In the embodiment illustrated in FIG. 1, the first and second floor portions 36, 38 face forward. Further, the inner wall 28, the first and second outer walls 24, 26, the plurality of first diagonal walls 32, and the plurality of second diagonal walls 34 extend forward from the first and second floor portions 36, 38.

Figure 3:
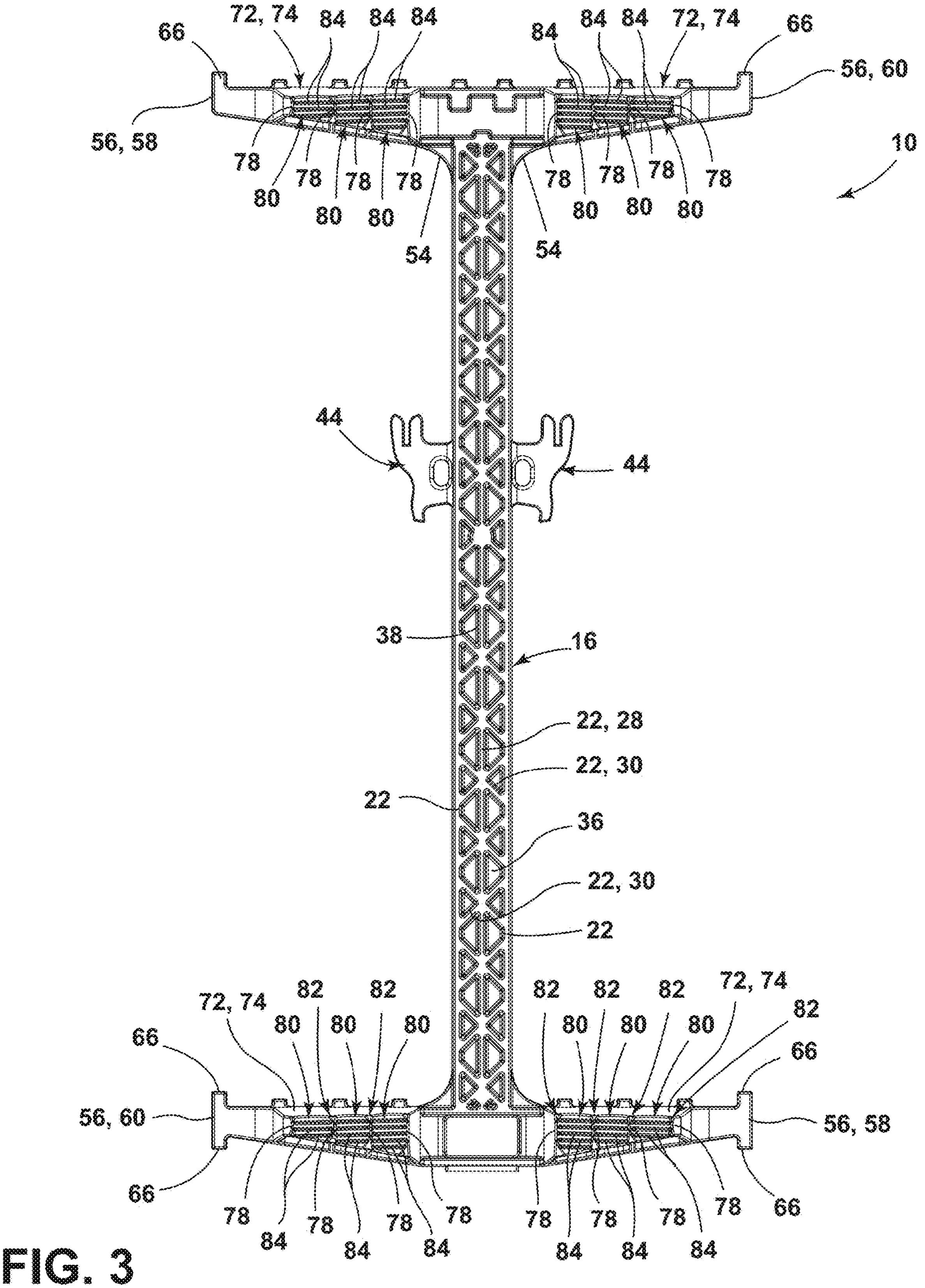
FIG. 3 is a rear elevational view of a rear side of a climbing stick.

Referring now to FIG. 3, in various implementations, at least one floor portion of the post 16 includes a channel-defining surface that faces rearward. In the embodiment illustrated in FIG. 3, the post 16 includes first and second floor portions that face rearward. Further, the post 16 includes an inner wall 28, first and second outer walls 24, 26, a plurality of first diagonal walls 32, and a plurality of second diagonal walls 34 that extend rearward from the first and second floor portions 36, 38. As such, the post 16 defines a plurality of first pockets 40 on the rear side of the post 16 and a plurality of second pockets 42 on the rear side of the post 16. In various embodiments, one or more pockets 40, 42 can be defined on the front side of the post 16 and the rear side of the post 16.

Figure 2:
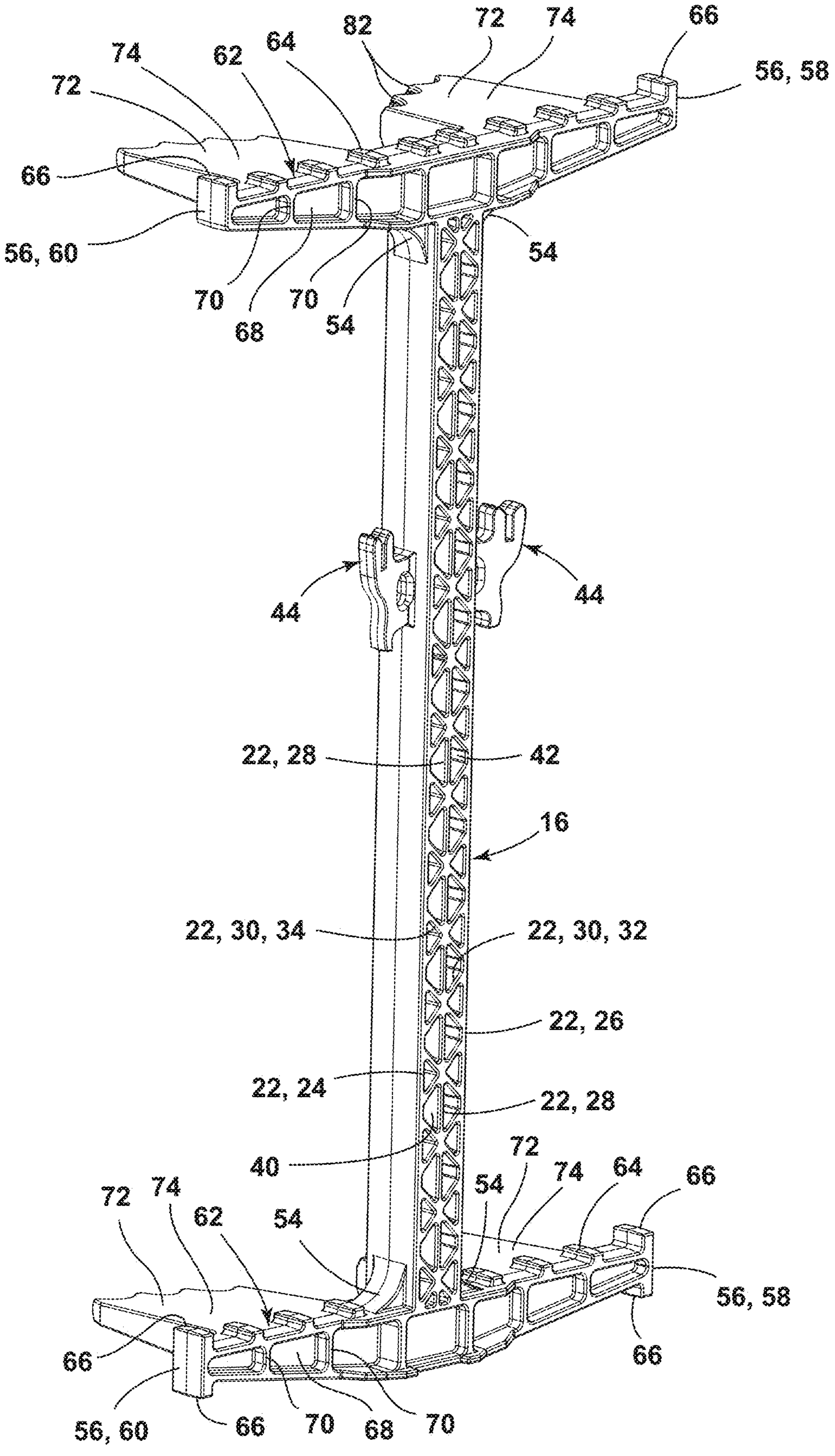
FIG. 2 is a top perspective view of a climbing stick.

Referring now to FIGS. 1-3, the climbing stick 10 can include a cleat 44. In various embodiments, the climbing stick 10 can include a plurality of cleats 44. For example, as illustrated in FIGS. 1-3, the climbing stick 10 includes two cleats 44. The cleat 44 is coupled to the post 16 between the first and second steps 12, 14 of the climbing stick 10. In various embodiments, the cleat 44 is coupled to the post 16 between the front and rear sides of the post 16. The cleat 44 includes a neck 46 that is coupled to the post 16 and extends outward therefrom. The cleat 44 further includes a head 48 that is coupled to the neck 46 distally from the post 16. In various implementations, the head 48 defines a slot 50. In the embodiment illustrated in FIG. 1, the slot 50 is defined on an upper side of the head 48, such that the slot 50 faces generally upward toward the second step 14 (i.e., the top step 20). It is contemplated that the slot 50 may face a variety of directions in various embodiments. In some embodiments, the slot 50 defined by the cleat 44 may have a width of about 2 mm. The slot 50 being about 2 mm wide may snugly accommodate certain types of rope that may be used to secure the climbing stick 10 to a tree, such as PARACORD®. In some implementations, the cleat 44 defines a cleat aperture 52. For example, as illustrated in FIGS. 1-3, the cleat 44 defines a cleat aperture 52.

Referring now to FIGS. 1-5, the climbing stick 10 includes the first and second steps 12, 14. In the illustrated embodiments, the first step 12 is the bottom step 18 and the second step 14 is the top step 20 positioned upward of the bottom step 18. As illustrated in FIG. 1, the post 16 extends between the first and second steps 12, 14 and is coupled to the first and second steps 12, 14 at corners 54. As illustrated, the corners 54 are generally rounded, which may advantageously influence resin flow and fiber orientation during injection molding of the climbing stick 10, as described further herein. As further illustrated in FIG. 1, the first and second steps 12, 14 extend laterally-outboard from the post 16 to laterally-distal ends 56 of the first and second steps 12, 14, respectively. In other words, as illustrated in FIG. 1, the first step 12 extends outward from the post 16 to the right to a right laterally-distal end 58 of the first step 12, and the first step 12 extends outward from the post 16 to the left to a left laterally-distal end 60 of the first step 12. Further, a second step 14 extends outward from the post 16 to the right to a right laterally-distal end 58 of the second step 14, and the second step 14 extends outward from the post 16 to the left to a left laterally-distal end 60 of the second step 14.

The first and second steps 12, 14 each includes an upper stepping surface 62. The upper stepping surface 62 faces upward and is configured to support the foot of a user standing on the first and/or second steps 12, 14. As illustrated in FIGS. 1 and 2, a plurality of traction ridges 64 extend upward from the upper stepping surfaces 62 of the first and second steps 12, 14. The traction ridges 64 extend in a forward-rearward direction and are spaced apart from each other in the lateral direction along the upper stepping surface 62 of each of the first and second steps 12, 14.

As illustrated in FIG. 1, the first step 12 includes a tang 66 that extends downward from the first step 12 away from the second step 14. It is contemplated that the first step 12 may include a plurality of tangs 66 that extend downward from the first step 12. For example, in the embodiment illustrated in FIG. 1, the first step 12 includes two tangs 66 that extend downward from the first step 12. The tang 66 may extend outward at the laterally-distal end 56 of the first step 12, in some embodiments. For example, in the embodiment illustrated in FIG. 1, the two tangs 66 of the first step 12 extend downward from the first step 12 at the left and right laterally-distal ends 60, 58 of the first step 12, respectively.

Referring still to FIG. 1, the second step 14 can include a tang 66 that extends upward from the second step 14 away from the first step 12. The second step 14 can include a plurality of tangs 66 that extend upward from the second step 14. For example, as illustrated in FIG. 1, the second step 14 includes two tangs 66 that extend upward from the second step 14. The tang 66 of the second step 14 can extend upward at the laterally-distal end 56 of the second step 14. For example, as illustrated in FIG. 1, the two tangs 66 of the second step 14 extend upward from the second step 14 at the left and right laterally-distal ends 60, 58 of the second step 14, respectively. In various implementations, the tang 66 of the second step 14 can extend upward from the upper stepping surface 62 of the second step 14 further than the traction ridges 64 of the second step 14 extend upward from the upper stepping surface 62 of the second step 14. In some embodiments, one or more of the tangs 66 of the first and second steps 12, 14 are laterally aligned with each other. In other words, the tang 66 of the first step 12 and the tang 66 of the second step 14 may be positioned relative to each other such that both tangs 66 fall within a plane extending normal to the lateral direction. In the embodiment illustrated in FIG. 1, the tang 66 positioned at the left laterally-distal end 60 of the first step 12 is laterally aligned with the tang 66 positioned at the left laterally-distal end 60 of the second step 14. Further, the tang 66 positioned at the right laterally-distal end 58 of the first step 12 is laterally aligned with the tang 66 positioned at the right laterally-distal end 58 of the second step 14.

In some embodiments, the first step 12 can include at least one tang 66 that extends upward from the laterally-distal ends 56 of the first step 12. For example, in the embodiment illustrated in FIG. 1, two tangs 66 extend upward from the left and right laterally-distal ends 60, 58 of the first step 12, and two tangs 66 extend downward from the left and right laterally-distal ends 60, 58 of the first step 12. In operation, the upward extending tangs 66 of the first and second steps 12, 14 which extend upward from the laterally-distal ends 56 of the first and second steps 12, 14, respectively, can serve as a tactile indication of where the laterally-distal ends 56 of the first and second steps 12, 14 are while the user is climbing. Further, the downward extending tangs 66 of the first step 12 and the upward extending tangs 66 of the second step 14 may act as hooks that can retain rope coiled about the first and second steps 12, 14.

Referring now to FIGS. 1 and 2, the first and/or second steps 12, 14 can define a plurality of step recesses 68. In various embodiments, the front side of the first step 12 and/or the front side of the second step 14 define the plurality of step recesses 68. As illustrated in FIG. 1, the plurality of step recesses 68 may be separated from each other and partially defined by one or more step walls 70. As illustrated in FIG. 1, the step walls 70 may extend generally parallel to the length of the post 16 and may have substantially the same lateral width as the inner wall 28 of the post 16. The first and/or second steps 12, 14 defining step recesses 68 separated by the step walls 70 may advantageously influence the flow of resin and the orientation of fibers 92 within the climbing stick 10 during the injection molding process, such that the structural integrity of the climbing stick 10 is enhanced.

Referring now to FIGS. 1-6, the climbing stick 10 includes at least one standoff 72. The at least one standoff 72 is configured to engage with a tree while the climbing stick 10 is in use. In various embodiments, the climbing stick 10 includes a plurality of standoffs 72 that are configured to engage with a tree. The at least one standoff 72 can extend rearward from the first and/or second steps 12, 14 of the climbing stick 10. In the embodiment illustrated in FIG. 3, the climbing stick 10 includes two standoffs 72 that extend rearward from the first step 12 and two standoffs 72 that extend rearward from the second step 14. As illustrated in FIG. 3, each standoff 72 of the climbing stick 10 is positioned laterally between one of the laterally-distal ends 56 of the first and second steps 12, 14 and the post 16 of the climbing stick 10. As shown in FIG. 3, upper surfaces 74 of the standoffs 72 that extend rearward from the first step 12 may be substantially flush with the upper stepping surface 62 of the first step 12 adjacent to the first step 12. Further, the upper surfaces 74 of the standoffs 72 that extend rearward from the second step 14 may be substantially flush with the upper stepping surface 62 of the second step 14 adjacent to the second step 14.

Figure 4:
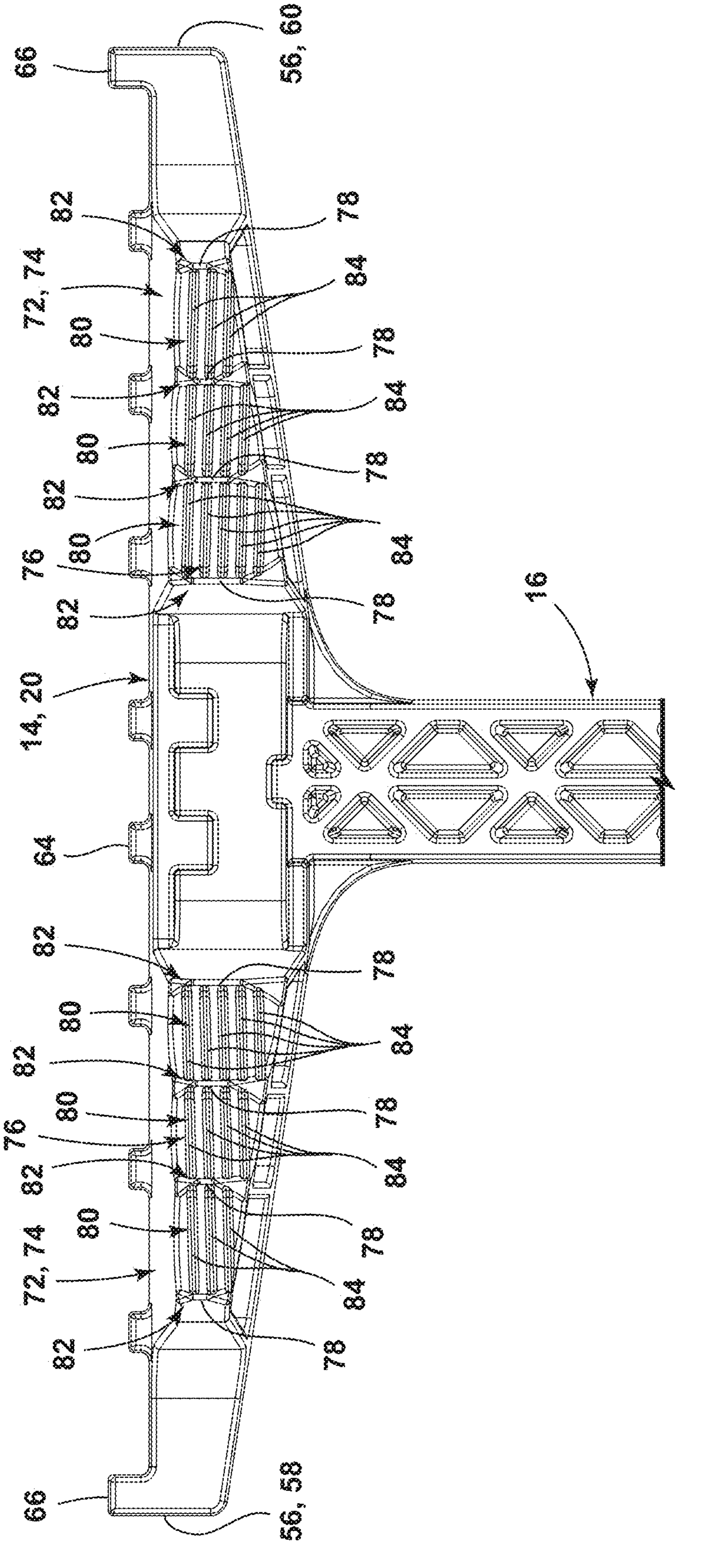
FIG. 4 is an enlarged view of a portion of the climbing stick of FIG. 3.
Figure 5:
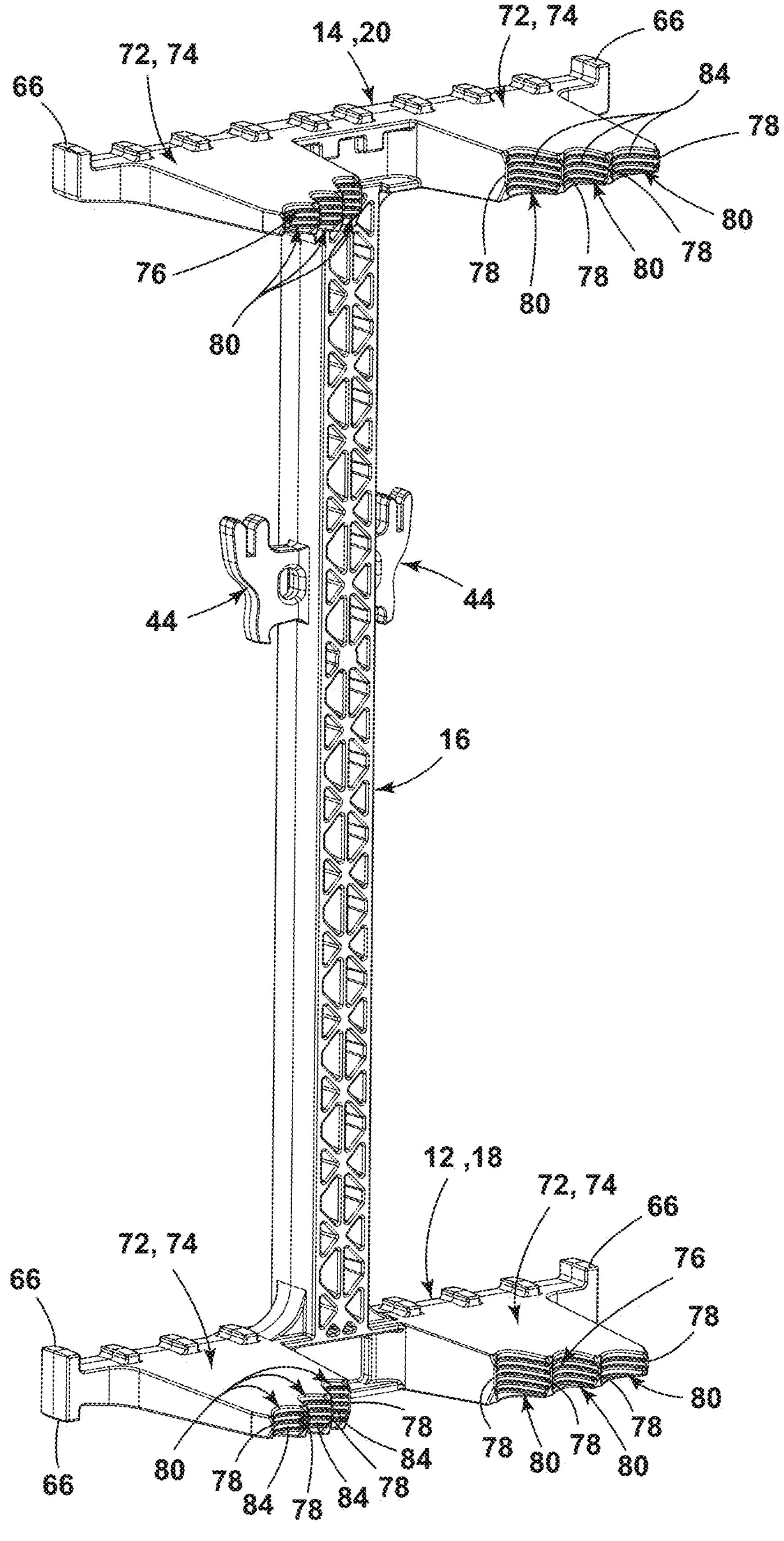
FIG. 5 is a bottom perspective view of a rear side of a climbing stick.

Referring now to FIGS. 3-5, the at least one standoff 72 coupled to the first and/or second steps 12, 14 may include a rear wall 76. In the embodiment illustrated in FIG. 3, the standoff 72 extends rearward from the first step 12 to a rear wall 76 of the standoff 72. The rear wall 76 of the standoff 72 includes a plurality of ridges 78 and a plurality of valleys 80 arranged in alternating fashion to form a plurality of teeth 82. As illustrated in FIG. 3, the at least one standoff 72 coupled to the second step 14 may extend rearward from the second step 14 to a rear wall 76 of the at least one standoff 72 that includes a plurality of ridges 78 and a plurality of valleys 80 arranged in alternating fashion to form a plurality of teeth 82. In various implementations, at least one of the plurality of valleys 80 may define a plurality of grooves 84. For example, in the embodiment illustrated in FIG. 4, each of the plurality of valleys 80 of the rear wall 76 of the at least one standoff 72 defines a plurality of grooves 84. In some implementations, the plurality of grooves 84 may be substantially parallel to each other. In some embodiments, the plurality of grooves 84 extend laterally along the at least one of the plurality of valleys 80. In some implementations, the plurality of grooves 84 extend along the at least one of the plurality of valleys 80 substantially perpendicularly to the lengthwise direction of the post 16.

In the embodiment illustrated in FIGS. 3 and 4, each of the plurality of valleys 80 defined on the rear walls 76 of the two standoffs 72 that extend rearward from each of the first and second steps 12, 14 defines a plurality of grooves 84, and the grooves 84 of each respective valley 80 are substantially parallel with each other.

Figure 6:
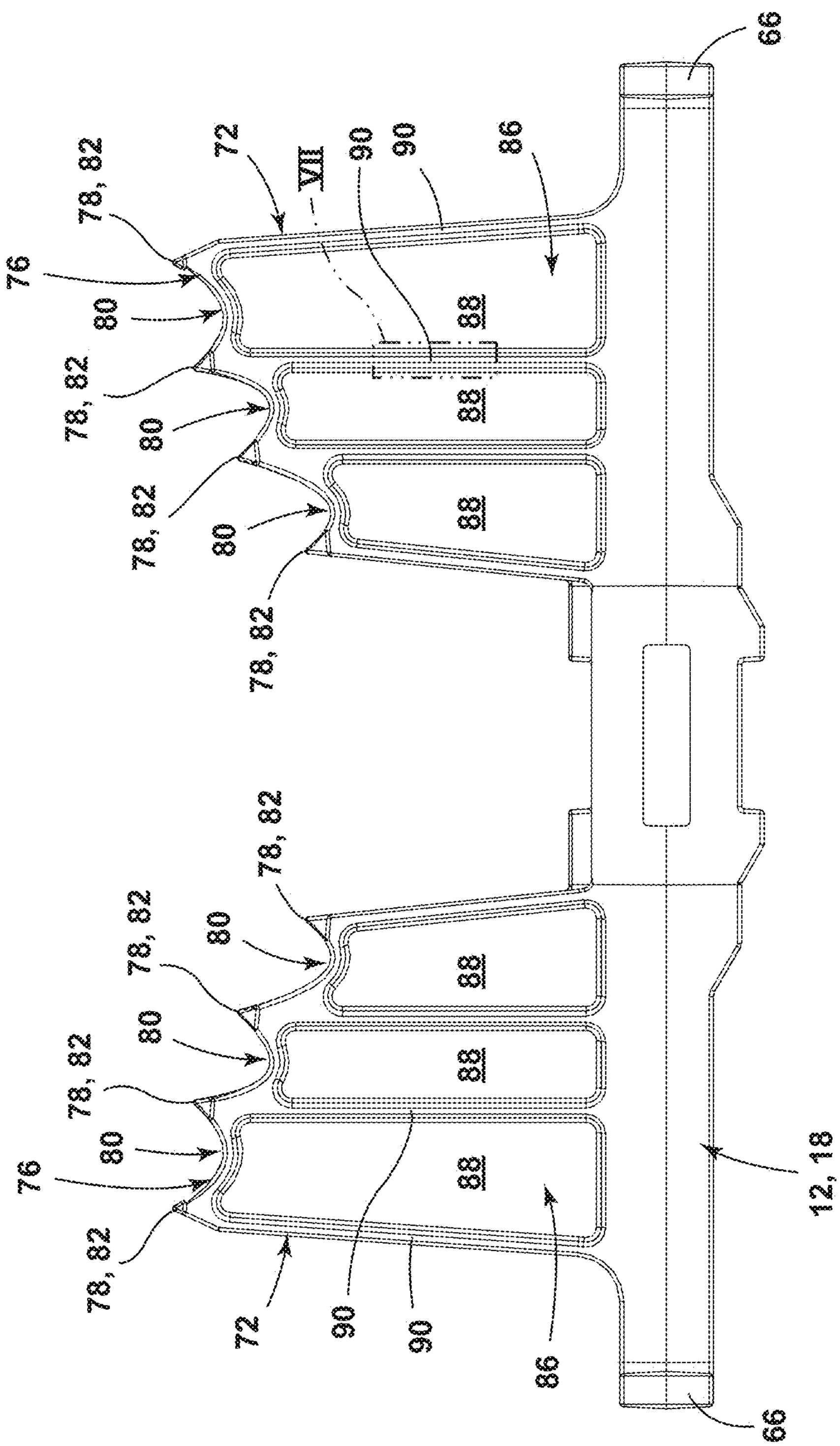
FIG. 6 is a bottom plan view of a climbing stick.

In various embodiments, a bottom side 86 of the at least one standoff 72 of the climbing stick 10 defines a plurality of standoff recesses 88. The plurality of standoff recesses 88 can be separated from each other and/or partially defined by a plurality of standoff ribs 90, as illustrated in FIG. 6. At least one standoff rib 90 may extend rearward from the first and/or second steps 12, 14 along a length of the at least one standoff rib 90. In some implementations, one or more standoff ribs 90 may extend rearward from the first and/or second steps 12, 14 and generally align with one or more of the plurality of ridges 78 of the rear wall 76 of the at least one standoff 72, as illustrated in FIG. 6. In some implementations, the length of the at least one standoff rib 90 may be substantially perpendicular to the length of the post 16. The at least one standoff 72 having a plurality of standoff recesses 88 that are separated by and partially defined by standoff ribs 90 may advantageously influence the flow of resin and the orientation of fibers 92 during injection molding of the climbing stick 10, such that the structural integrity of the climbing stick 10 is enhanced. Further, the orientation of fibers 92 within the at least one standoff rib 90 may enhance the structural integrity of the at least one standoff 72, as described further herein.

Figure 7:
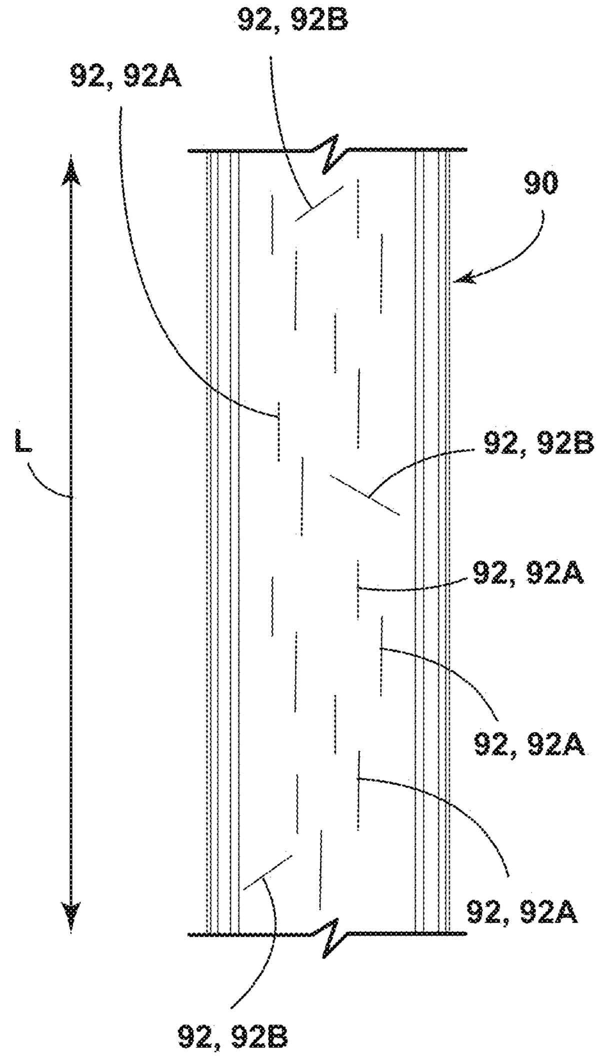
FIG. 7 is a schematic representation of area VII of a standoff wall of the climbing stick of FIG. 6.

Referring now to FIGS. 6 and 7, the climbing stick 10 can be an injection-molded climbing stick 10. As such, the climbing stick 10 may be formed of a resin that is injected into a mold and cooled to form an integral component. A variety of types of resins, such as thermoplastics, are contemplated. Further, a variety of types of thermoplastics are contemplated. The injection-molded climbing stick 10 may further be formed of a plurality of fibers 92 that are disposed within the resin. A variety of types of fibers 92 are contemplated. For example, the injection-molded climbing stick 10 may include one or more of a host of types of fibers 92 that may include, but is not limited to, carbon, glass, aramid, basalt, polyacrylonitrile, polyethylene terephthalate, and/or polypropylene fibers. Further, the injection-molded climbing stick 10 can include long fibers and/or short fibers. In an exemplary embodiment, the injection-molding climbing stick 10 is formed of a thermoplastic resin in short carbon fibers. As such, the climbing stick 10 is a short carbon fiber-reinforced thermoplastic climbing stick 10. Various combinations of resins and fibers are contemplated. In various embodiments, fibers 92 disposed within the climbing stick 10 are aligned with each other and/or aligned with a given climbing stick-direction to enhance the structural integrity of the climbing stick 10. For example, fibers disposed within the inner wall 28 and/or the outer walls 24, 26 of the post 16 of the climbing stick 10 may be aligned with each other along a length of the post 16.

With reference to FIGS. 6 and 7, in some embodiments, fibers 92 disposed within the at least one standoff rib 90 are aligned with each other along the length of the standoff rib 90. In an exemplary embodiment, wherein the standoff rib 90 extends rearward from the first step 12 along the length of the standoff rib 90, the standoff rib 90 comprises a plurality of fibers 92 that includes every fiber 92 that is disposed within the standoff rib 90 of the climbing stick 10. The plurality of fibers 92 within the standoff rib 90 includes a sub-plurality of fibers 92A. Each fiber 92A in the sub-plurality of fibers 92A is elongated in the lengthwise direction of the fiber 92A. Further, each fiber 92A in the sub-plurality of fibers 92A is oriented such that the lengthwise direction is substantially parallel to the length of the standoff rib 90. In various embodiments, the plurality of fibers 92 that includes every fiber 92 that is disposed within the standoff rib 90 includes fibers 92B that are not oriented such that the lengthwise direction of the fiber 92B is substantially parallel to the length of the standoff rib 90. In various embodiments, the sub-plurality of fibers 92A includes a majority of the fibers 92 in the plurality of fibers 92 disposed within the standoff rib 90. In some embodiments, the sub-plurality of fibers 92A includes between about 60% and 100% of the fibers 92 in the plurality of fibers 92 disposed within the standoff rib 90. In some embodiments, the sub-plurality of fibers 92A includes between about 75% and 100% of the fibers 92 in the plurality of fibers 92 disposed within the standoff rib 90. In some embodiments, the sub-plurality of fibers 92A includes between about 90% and 100% of the fibers 92 in the plurality of fibers 92 disposed within the standoff rib 90. In some embodiments, the sub-plurality of fibers 92A includes between about 95% and 100% of the fibers 92 in the plurality of fibers 92 disposed within the standoff rib 90. In some embodiments, the sub-plurality of fibers 92A includes between about 99% and 100% of the fibers 92 in the plurality of fibers 92 disposed within the standoff rib 90.

In various embodiments, fibers 92 are oriented substantially parallel to the length L of the standoff rib 90 when the lengthwise direction of the fiber 92 is angled less than about 30° relative to the length L of the standoff rib 90. In some embodiments, substantially parallel to the length L of the standoff rib 90 is an angle of less than about 15° relative to the length L of the standoff rib 90. In some embodiments, substantially parallel to the length L of the standoff rib 90 is an angle of less than about 10° relative to the length L of the standoff rib 90. In some embodiments, substantially parallel to the length L of the standoff rib 90 is an angle of less than about 5° relative to the length L of the standoff rib 90. In various implementations, the sub-plurality of fibers 92A in the standoff rib 90 may be oriented such that they are substantially perpendicular to the length of the post 16 of the climbing stick 10.

The present disclosure may provide a variety of advantages. First, forming the climbing stick 10 of a thermoplastic resin via injection molding results in the climbing stick 10 being significantly lighter than similarly sized climbing sticks that are formed of conventional materials, such as metal. Second, despite the reduced weight of the climbing stick 10 enabled by use of the thermoplastic material, the sub-plurality of fibers 92A that are oriented substantially parallel with the length of the standoff rib 90 and the strategic orientation of fibers to be substantially parallel with the length of the post 16 in the inner and outer walls 28, 24, 26 of the post 16 may ensure that the climbing stick 10 has sufficient structural integrity for conventional use. Third, the post 16 including the inner and outer walls 28, 24, 26 and the pluralities of first and second diagonal walls 32, 34 may further contribute to the structural integrity of the climbing stick 10. Fourth, the valleys 80 of the rear wall 76 of the at least one standoff 72 including the plurality of grooves 84 may allow the at least one standoff 72 to more effectively engage a tree that the climbing stick 10 is mounted to, such that squeaking and other undesirable noise caused by movement of the climbing stick 10 relative to the tree during use of the climbing stick 10 is satisfactorily reduced.

According to one aspect of the disclosure, an injection-molded climbing stick includes a first step, a second step, a post extending from the first step to the second step along a length of the post, and a standoff. The post includes a first outer wall that extends in a lengthwise direction of the post, a second outer wall that extends in the lengthwise direction of the post, an inner wall that extends in the lengthwise direction of the post and is positioned between the first and second outer walls, a plurality of first diagonal walls each of which extends upward and rightward from the first outer wall to the second outer wall, a plurality of second diagonal walls each of which extends upward and leftward from the second outer wall to the first outer wall, a first floor portion that extends in the lengthwise direction of the post and extends between the first outer wall and the inner wall, and a second floor portion that extends in the lengthwise direction of the post and extends between the second outer wall and the inner wall. The first floor portion is interrupted by the pluralities of first and second diagonal walls. Further, the second floor portion is interrupted by the pluralities of first and second diagonal walls. The standoff extends rearward from the first step to a rear wall of the standoff and includes a plurality of ridges and a plurality of valleys arranged in alternating fashion to form a plurality of teeth. At least one of the plurality of valleys defines a plurality of grooves.

According to another aspect, each of the plurality of valleys defines a plurality of grooves.

According to another aspect, the plurality of grooves are substantially parallel to each other.

According to another aspect, the plurality of grooves extends laterally along the at least one of the plurality of valleys.

According to another aspect, the plurality of grooves extends along the at least one of the plurality of valleys substantially perpendicularly to the lengthwise direction of the post.

According to another aspect, the first outer wall, the inner wall, the plurality of first diagonal walls, the plurality of second diagonal walls, and the first floor portion cooperate to define a plurality of first pockets disposed along the post.

According to another aspect, the second outer wall, the inner wall, the plurality of first diagonal walls, the plurality of second diagonal walls, and the second floor portion cooperate to define a plurality of second pockets disposed along the length of the post.

According to another aspect, the standoff includes at least one standoff rib that extends rearward from the first step along a length of the at least one standoff rib, the at least one standoff rib comprising a plurality of fibers that includes every fiber that is disposed within the at least one standoff rib. The plurality of fibers includes a sub-plurality of fibers. Each fiber in the sub-plurality of fibers is elongated in a lengthwise direction of the fiber and oriented such that the lengthwise direction is substantially parallel to the length of the at least one standoff rib. Further, the sub-plurality of fibers includes a majority of the fibers in the plurality of fibers.

According to another aspect, the length of the post is substantially perpendicular to the length of the at least one standoff rib.

According to another aspect, the at least one standoff rib aligns with at least one of the plurality of ridges of the rear wall of the standoff.

According to another aspect of the disclosure, a climbing stick includes a first step, a second step, and a post extending from the first step to the second step along a length of the post. The post includes a first outer wall that extends in a lengthwise direction of the post, a second outer wall that extends in the lengthwise direction of the post, an inner wall that extends in the lengthwise direction of the post and is positioned between the first and second outer walls, a plurality of first diagonal walls each of which extends upward and rightward from the first outer wall to the second outer wall, a plurality of second diagonal walls each of which extends upward and leftward from the second outer wall to the first outer wall, a first floor portion that extends in the lengthwise direction of the post and extends between the first outer wall and the inner wall, and a second floor portion that extends in the lengthwise direction of the post and extends between the second outer wall and the inner wall. The first floor portion is interrupted by the pluralities of first and second diagonal walls. Further, the second floor portion is interrupted by the pluralities of first and second diagonal walls.

According to another aspect, the first outer wall, the inner wall, the plurality of first diagonal walls, the plurality of second diagonal walls, and the first floor portion cooperate to define a plurality of first pockets disposed along the post.

According to another aspect, the second outer wall, the inner wall, the plurality of first diagonal walls, the plurality of second diagonal walls, and the second floor portion cooperate to define a plurality of second pockets disposed along the length of the post.

According to another aspect, a standoff extends rearward from the first step to a rear wall of the standoff and includes a plurality of ridges and a plurality of valleys arranged in alternating fashion to form a plurality of teeth. At least one of the plurality of valleys defines a plurality of grooves.

According to another aspect of the disclosure, an injection-molded climbing stick includes a first step, a second step, a post extending from the first step to the second step along a length of the post, and a standoff extending rearward from the first step to a rear wall of the standoff that includes a plurality of ridges and a plurality of valleys arranged in alternating fashion to form a plurality of teeth, wherein at least one of the plurality of valleys defines a plurality of grooves.

According to another aspect, each of the plurality of valleys defines a plurality of grooves.

According to another aspect, the plurality of grooves are substantially parallel to each other.

According to another aspect, the plurality of grooves extends laterally along the at least one of the plurality of valleys.

According to another aspect, the plurality of grooves extends along the at least one of the plurality of valleys substantially perpendicularly to the lengthwise direction of the first post. According to another aspect, the climbing stick is an injection molded climbing stick, and the standoff includes at least one standoff rib that extends rearward from the first step along a length of the at least one standoff rib, the at least one standoff rib comprising a plurality of fibers that includes every fiber that is disposed within the at least one standoff rib. The plurality of fibers includes a sub-plurality of fibers. Each fiber in the sub-plurality of fibers is elongated in a lengthwise direction of the fiber and oriented such that the lengthwise direction is substantially parallel to the length of the at least one standoff rib. Further, the sub-plurality of fibers includes a majority of the fibers in the plurality of fibers.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, or the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A climbing stick, comprising:

a first step;

a second step;

a post extending from the first step to the second step along a length of the post; and a standoff that extends rearward of the first step and having a rear wall that includes a plurality of ridges and a plurality of valleys arranged in alternating fashion to form a plurality of teeth, wherein at least one of the plurality of valleys further includes a plurality of grooves, and wherein each of the grooves extends transversely to a longitudinal direction of the at least one valley.

2. The climbing stick of claim 1, wherein each of the plurality of valleys defines a plurality of grooves.

3. The climbing stick of claim 1, wherein the plurality of grooves are substantially parallel to each other.

4. The climbing stick of claim 1, wherein each of the grooves of the plurality of grooves extends laterally along the at least one of the plurality of valleys.

5. The climbing stick of claim 1, wherein each of the grooves of the plurality of grooves extends along the at least one of the plurality of valleys substantially perpendicularly to the lengthwise direction of the first-post.

6. The climbing stick of claim 1, wherein the climbing stick is an injection molded climbing stick, and the standoff includes at least one standoff rib that extends rearward from the first step along a length of the at least one standoff rib, the at least one standoff rib comprising a plurality of fibers that includes every fiber that is disposed within the at least one standoff rib, wherein the plurality of fibers includes a sub-plurality of fibers, wherein each fiber in the sub-plurality of fibers is elongated in a lengthwise direction of the fiber and oriented such that the lengthwise direction is substantially parallel to the length of the at least one standoff rib, and wherein the sub-plurality of fibers includes a majority of the fibers in the plurality of fibers.

7. A climbing stick, comprising:

a first step;

a second step;

a post extending from the first step to the second step along a length of the post; and a standoff that extends rearward of the first step and having a rear wall that includes a plurality of ridges and a plurality of valleys arranged in alternating fashion to form a plurality of teeth, wherein at least one of the plurality of valleys includes a plurality of raised portions and a plurality of recessed portions that are recessed relative to adjacent raised portions within the at least one valley, wherein each of the recessed portions extends transversely to a longitudinal direction of the at least one valley.

8. The climbing stick of claim 7, wherein the plurality of recessed portions comprises a plurality of grooves, and the plurality of grooves are substantially parallel to each other.

9. The climbing stick of claim 8, wherein each of the grooves of the plurality of grooves extends laterally along the at least one of the plurality of valleys.

10. The climbing stick of claim 9, wherein each of the grooves of the plurality of grooves extends along the at least one of the plurality of valleys substantially perpendicularly to the lengthwise direction of the post.

11. The climbing stick of claim 7, wherein each of the recessed portions of the plurality of recessed portions extends along its length transversely to the longitudinal direction of the at least one valley.

12. The climbing stick of claim 7, wherein the post comprises:

a first outer wall that extends in a lengthwise direction of the post;

a second outer wall that extends in the lengthwise direction of the post;

an inner wall that extends in the lengthwise direction of the post and is positioned between the first and second outer walls;

a plurality of first diagonal walls each of which extends upward and rightward from the first outer wall to the second outer wall;

a plurality of second diagonal walls each of which extends upward and leftward from the second outer wall to the first outer wall;

a first floor portion that extends in the lengthwise direction of the post and extends between the first outer wall and the inner wall, wherein the first floor portion is interrupted by the pluralities of first and second diagonal walls; and a second floor portion that extends in the lengthwise direction of the post and extends between the second outer wall and the inner wall, wherein the second floor portion is interrupted by the pluralities of first and second diagonal walls.

13. The climbing stick of claim 12, wherein the first outer wall, the inner wall, the plurality of first diagonal walls, the plurality of second diagonal walls, and the first floor portion cooperate to define a plurality of first pockets disposed along the post.

14. The climbing stick of claim 13, wherein the second outer wall, the inner wall, the plurality of first diagonal walls, the plurality of second diagonal walls, and the second floor portion cooperate to define a plurality of second pockets disposed along the length of the post.

15. The climbing stick of claim 7, wherein the climbing stick is an injection molded climbing stick, and the standoff includes at least one standoff rib that extends rearward from the first step along a length of the at least one standoff rib, the at least one standoff rib comprising a plurality of fibers that includes every fiber that is disposed within the at least one standoff rib, wherein the plurality of fibers includes a sub-plurality of fibers, wherein each fiber in the sub-plurality of fibers is elongated in a lengthwise direction of the fiber and oriented such that the lengthwise direction is substantially parallel to the length of the at least one standoff rib, and wherein the sub-plurality of fibers includes a majority of the fibers in the plurality of fibers.

16. The climbing stick of claim 15, wherein the length of the post is substantially perpendicular to the length of the at least one standoff rib.

17. The climbing stick of claim 15, wherein the at least one standoff rib aligns with at least one of the plurality of ridges of the rear wall of the standoff.

* * * * *